(12) United States Patent
Kato

(10) Patent No.: US 7,880,795 B2
(45) Date of Patent: Feb. 1, 2011

(54) LENS APPARATUS AND CAMERA SYSTEM

(75) Inventor: Takashi Kato, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 470 days.

(21) Appl. No.: 11/943,246

(22) Filed: Nov. 20, 2007

(65) Prior Publication Data
US 2008/0136941 A1    Jun. 12, 2008

(30) Foreign Application Priority Data
Dec. 7, 2006  (JP)  ............................. 2006-330568

(51) Int. Cl.
H04N 5/225  (2006.01)
(52) U.S. Cl. ................................... 348/335
(58) Field of Classification Search ................ 348/360, 348/363, 335, 344, 345, 240.99, 368; 396/63–66
See application file for complete search history.

(56) References Cited

U.S. PATENT DOCUMENTS

| | | | |
|---|---|---|---|
| 4,203,661 A * | 5/1980 | Besenmatter | 396/63 |
| 5,691,851 A | 11/1997 | Nishio et al. | 359/683 |
| 5,905,530 A | 5/1999 | Yokota et al. | 348/240 |
| 6,028,716 A | 2/2000 | Kato et al. | 359/689 |
| 6,236,517 B1 | 5/2001 | Kato et al. | 359/692 |
| 6,493,143 B2 | 12/2002 | Kato | 359/566 |
| 2002/0047912 A1 * | 4/2002 | Mabuchi et al. | 348/345 |
| 2003/0063815 A1 * | 4/2003 | Watanabe | 382/255 |
| 2010/0092103 A1 * | 4/2010 | Ishiga | 382/264 |

FOREIGN PATENT DOCUMENTS

JP    2000-162692    6/2000

* cited by examiner

Primary Examiner—David L Ometz
Assistant Examiner—Akshay Trehan
(74) Attorney, Agent, or Firm—Fitzpatrick, Cella, Harper & Scinto

(57) ABSTRACT

A lens apparatus includes an optical system having an aperture unit and a plurality of extender lenses that are selectively locatable in an optical axis. The lens apparatus is mountable on a camera having an image pickup element. To maintain the brightness of the image when changing the extender lens, the lens apparatus has a memory in which correction data associated with aperture values for each extender lens, and the aperture unit is driven using the correction data according to information on the extender lens.

9 Claims, 5 Drawing Sheets

| (0) | (1) | (2) | (3) | (4) | (5) |
|---|---|---|---|---|---|
| CORRECTION DATA OF F2.8 | CORRECTION DATA OF F4 | CORRECTION DATA OF F5.6 | CORRECTION DATA OF F8 | CORRECTION DATA OF F11 | CORRECTION DATA OF F16 |

# LENS APPARATUS AND CAMERA SYSTEM

BACKGROUND OF THE INVENTION

1. Field of the Invention

The present invention relates to a lens apparatus and a camera system in which the aperture value is automatically adjusted to keep the brightness of the image constant even when the image taking magnification is changed by an extender lens.

2. Description of the Related Art

In television lens apparatus equipped with an extender lens, when the magnification of the extender lens is changed, the F-number changes with the focal length. In some known apparatuses, the aperture value is corrected according to the magnification of the extender lens, whereby the F-number is controlled to be constant irrespective of the magnification of the extender lens.

For example, according to an apparatus disclosed in Japanese Patent Application Laid-Open No. 2000-162692, in view of the fact that changing the magnification of the extender lens from 1 to 2 results in decrease of the light quantity to half, aperture correction is performed so that the aperture or stop is opened to double the light quantity so as not to change the brightness when the magnification of the extender lens is changed.

In connection with this, there is an error or difference between the theoretical aperture value that is optically determined and the aperture value adjusted by electrical control. In the case where the error is constant for all the aperture values, an offset equivalent to the difference may be added to the aperture correction amount.

In the case where the error varies depending on the stop value, if correction is performed with a constant correction value, accurate correction cannot be achieved at aperture values involving large errors, and changing the extender lens causes a change in the brightness of the image. On the other hand, at aperture values involving small errors, accurate correction is achieved, and changing the extender lens does not cause a change in the brightness of the image.

SUMMARY OF THE INVENTION

The present invention has been made in view of the above-mentioned problem.

It is desirable to provide a lens apparatus in which when the image taking magnification is changed by an extender lens, the aperture value is adjusted to keep the brightness of the image constant.

According to the first aspect of the present invention, there is provided a lens apparatus mounted on a camera apparatus having an image pickup element, the lens apparatus comprising an optical system including a plurality of lenses and a plurality of extender lenses, the extender lenses being selectively disposed in an optical path, an aperture unit that adjusts light quantity in the optical system, a controller that controls driving of the aperture unit by an aperture control signal according to brightness information from the image pickup element, a detector that detects an extender lens, among the plurality of extender lenses, that is disposed in the optical path, the detector outputting information on the extender lens associated with the extender lens disposed in the optical path, and a memory that stores a plurality of correction data associated with aperture values for each of the plurality of extender lenses, wherein the controller obtains interpolation data based on the plurality of correction data stored in the memory associated with the information on the extender lens and the aperture control signal and drives the aperture unit based on the interpolation data and the aperture control signal.

Further features of the present invention will become apparent from the following description of exemplary embodiments with reference to the attached drawings.

DESCRIPTION OF THE EMBODIMENTS

In the following, the present invention will be described based on an exemplary embodiment with reference to the drawings.

Figure 1:
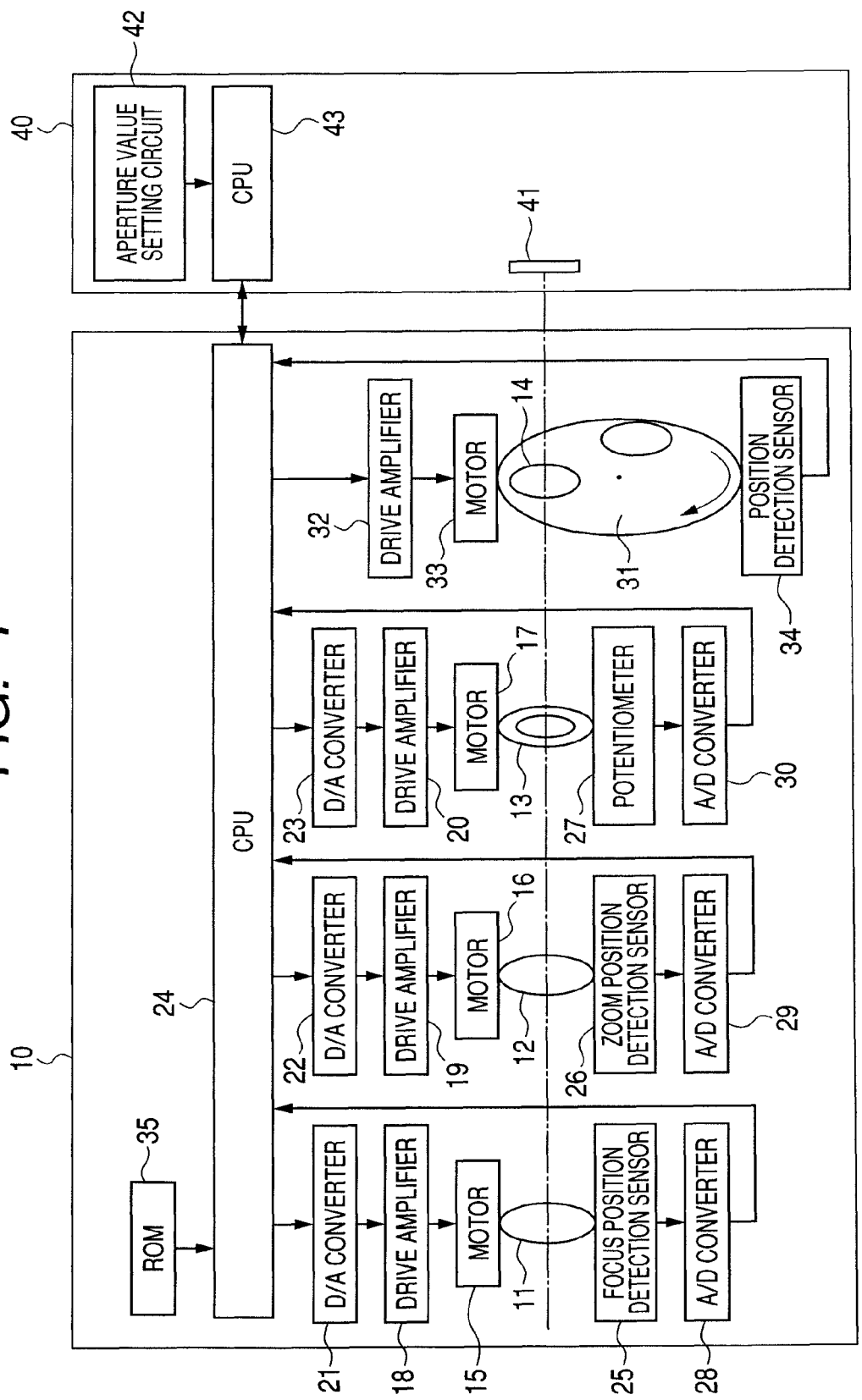
FIG. 1 is a diagram showing the configuration of a television camera lens apparatus according to an embodiment.

FIG. 1 is a diagram showing the configuration of the embodiment. A television camera lens 10 is mounted on and connected with a television camera 40. The television camera lens 10 has a focusing lens 11, a zooming lens 12, a stop 13 and a plurality of extender lenses 14 arranged to be moveable into the optical axis. The television camera lens 10 is also provided with drive motors 15, 16, 17, drive amplifiers 18, 19, 20 and D/A converters 21, 22, 23 to drive the lenses 11, 12 and the stop (aperture) 13. The drive motors 15, 16, 17, the drive amplifiers 18, 19, 20 and the D/A converters 21, 22, 23 are configured to be operated by commands from a CPU 24 according to a program.

The positions of the lenses 11, 12 and the stop 13 are detected respectively by a focus position detection sensor 25, a zoom position detection sensor 26 and a potentiometer 27, which are connected with the CPU 24 via A/D converters 28, 29, 30 respectively.

The plurality of extender lenses 14 is held on a turret 31, which is driven by a drive motor 33 based on a command from the CPU 24 through a drive amplifier 32. The position of the turret 31 is detected by a position detection sensor 34. The CPU 24 functioning as control means is connected with a ROM 35 serving as memory means.

The television camera 40 has an image pickup element 41 arranged on the optical axis of the television camera lens 10. The television camera 40 is also provided with an aperture value setting circuit 42 and a CPU 43. The output of the aperture value setting circuit 42 is connected to the CPU 43. The CPU 43 is connected with the CPU 24 in the television camera lens 10. With the above described configuration, a stop drive signal is generated by the aperture value setting circuit 42 based on brightness information from the image pickup element 41, and an aperture control signal is output from the CPU 43 to the CPU 24 in the television camera lens 10.

The focusing lens 11 and the zooming lens 12 are moved along the optical axis by the focus drive motor 15 and the zoom drive motor 16 respectively. The drive motors 15 and 16 are controlled by the drive amplifiers 18 and 19 respectively. The focusing lens 11 and the zooming lens 12 are driven according to command signals that are generated by the CPU 24 with reference to signals from the position detection sensors 25 and 26 that detect the positions of the respective lenses.

The aperture value of the stop 13 is adapted to be varied by the stop drive motor 17. The stop drive motor 17 is controlled by the stop drive amplifier 20. The stop 13 is driven according to a command signal that is generated by the CPU 24 with reference to a detection signal of the potentiometer 27 that detects the aperture value.

Figure 2:
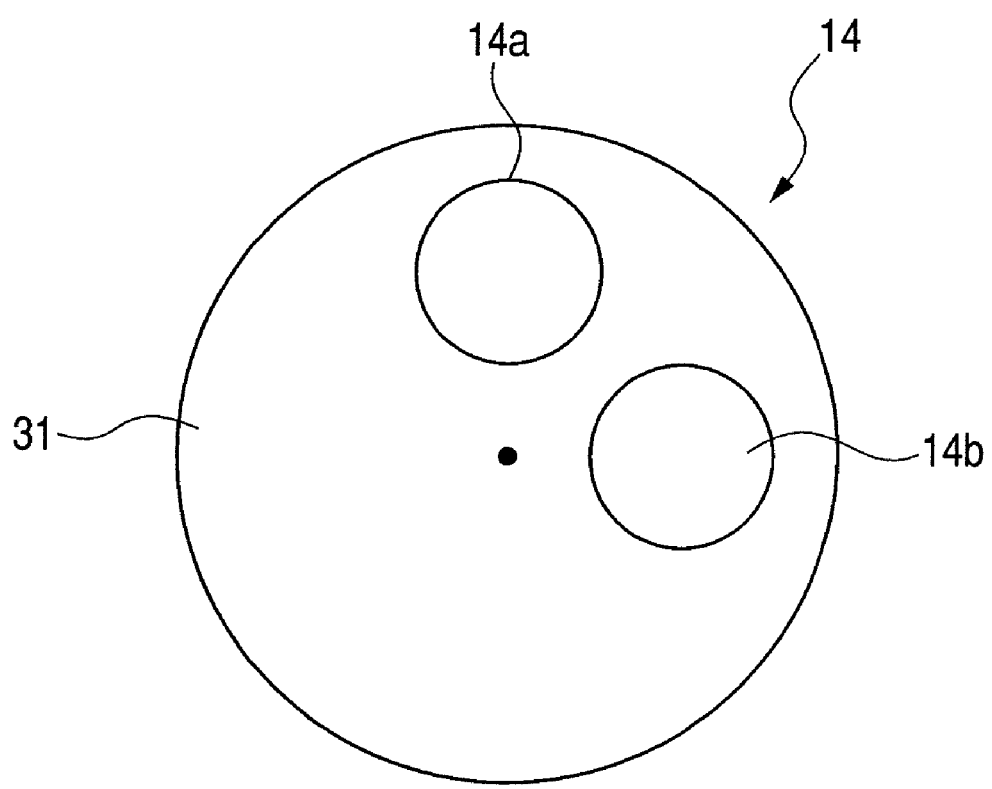
FIG. 2 illustrates the structure of an extender lens.

FIG. 2 is a diagram illustrating the extender lenses 14, in which an extender lens 14a having magnification factor of 1 and an extender lens 14b having magnification factor of 2 are arranged on a rotatable disk-like turret 31. The turret 31 is rotated by the drive motor 33, whereby the extender lenses 14a and 14b are switched or selectively positioned on the optical axis. The drive motor 33 is controlled by the drive amplifier 32 and driven according to a command signal input from the CPU 24. Which extender lens 14 is being selected or the rotational position of the turret 31 is detected by the position detection sensor 34, and the detection result is input to the CPU 24. As an alternative, the CPU 24 can store information on the drive command signals supplied to identify which extender lens is currently in the optical path.

As per the above, the CPU 24 outputs command signals to the drive amplifiers to control them based on command signals for the focusing lens 11, the zooming lens 12 and the stop 13 input from the respective sensors and the like.

Figure 3:
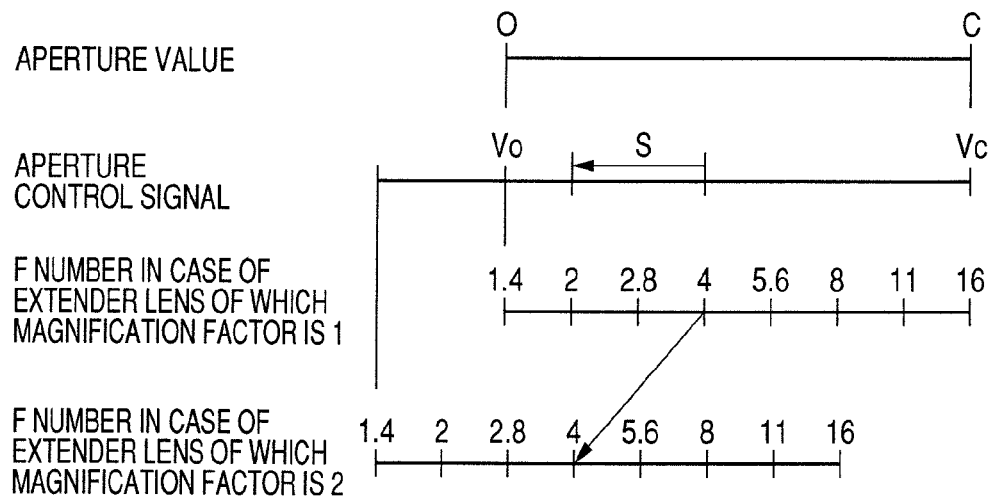
FIG. 3 illustrates relationship between aperture values and F-numbers.

FIG. 3 shows the relationship between the range of the value of the aperture control signal that prescribes the aperture value and the F-number in the case in which the extender lens 14a having magnification factor of 1 is inserted in the optical path, and the F-number in the case in which the extender lens 14b having magnification factor of 2 is inserted. The value of the aperture control signal ranges from Vo to Vc, which corresponds to the variable range of the aperture value from O (open) to C (close).

For example, in the case where an extender lens 14a having magnification factor of 1 is inserted, the F-number varies over the range of F1.4 to F16 as the aperture value varies over the variable range of O to C. In the case where the extender lens 14b having a magnification factor of 2 is inserted, the F-number generally becomes larger in relation to the variable range of the aperture value. Accordingly, if the aperture value is set to the position prescribed by the value of the aperture control signal, the F-number varies depending on the magnification of the extender lens 14, which means that the brightness of the image changes when the magnification is changed.

In view of the above, when the extender lens 14 is changed from the extender lens 14a having magnification factor of 1 to the extender lens 14b having magnification factor of 2, the value corresponding to the shift amount of the F-number range is added to the value of the aperture control signal. Consequently, by setting the stop to a position designated by the resultant value, a change in the brightness upon changing the extender lens 14 is compensated.

For example, assuming in FIG. 3 that the aperture value in the case of extender lens 14a having a magnification factor of 1 is F4, when the extender lens is changed to the extender lens 14b having a magnification factor of 2, the light quantity decreases to half, and the F-number becomes F8 if no correction is made. In view of this, a value corresponding to a shift amount S of the F-number is added to the value of the aperture control signal to change the aperture value, whereby the brightness F4 the same as that before switching to the extender lens 14b can be maintained.

There is an error or difference between the theoretical aperture value that is optically determined and the aperture value electrically adjusted. This error varies depending on the aperture value. Accordingly, if correction is performed with a constant shift amount S, the corrected aperture value is not achieved at aperture values at which the above mentioned difference is large. This sometimes results in a change in the brightness upon switching to the extender lens 14b.

In this embodiment, to eliminate the above described problem, a constant shift amount S is not used, but shift amounts S that have been determined taking into consideration differences at various aperture values are prepared in the form of a data table and used in correcting the aperture value.

Figure 4:
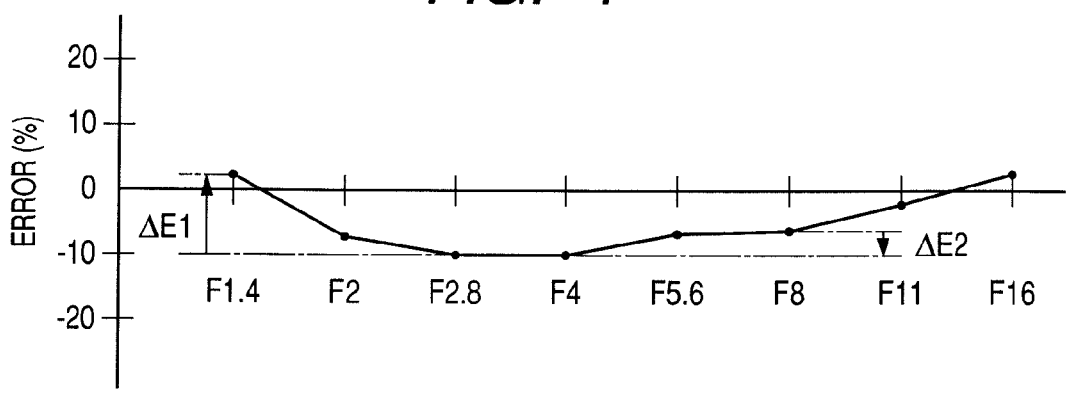
FIG. 4 is a graph showing errors in relation to F-numbers

FIG. 4 is a graph showing exemplary errors or differences between the F-number and the actual F-number. For example, when the magnification factor of the extender lens 14 is changed from 1 to 2 in the state of F2.8, the error at F1.4 relative to F2.8 is obtained as ΔE1 by adding the respective values corresponding to S at F1.4 and F2.8. Accordingly, if correction is performed by shifting the aperture value by the above mentioned shift amount S, the image will become darker than that before the correction due to error ΔE1. Conversely, when the magnification factor of the extender lens 14 is changed from 1 to 2 in the state of F8, the image will become brighter than that before correction due to error ΔE2.

In view of the above, in the former case, a value corresponding to error ΔE1 is added to the F-number shift amount S in performing the correction. In the latter case, a value corresponding to error ΔE2 is subtracted from the shift amount S in performing the correction. Thus, the brightness can be kept constant before and after the switching of the extender lens 14.

Figures 5, 6:
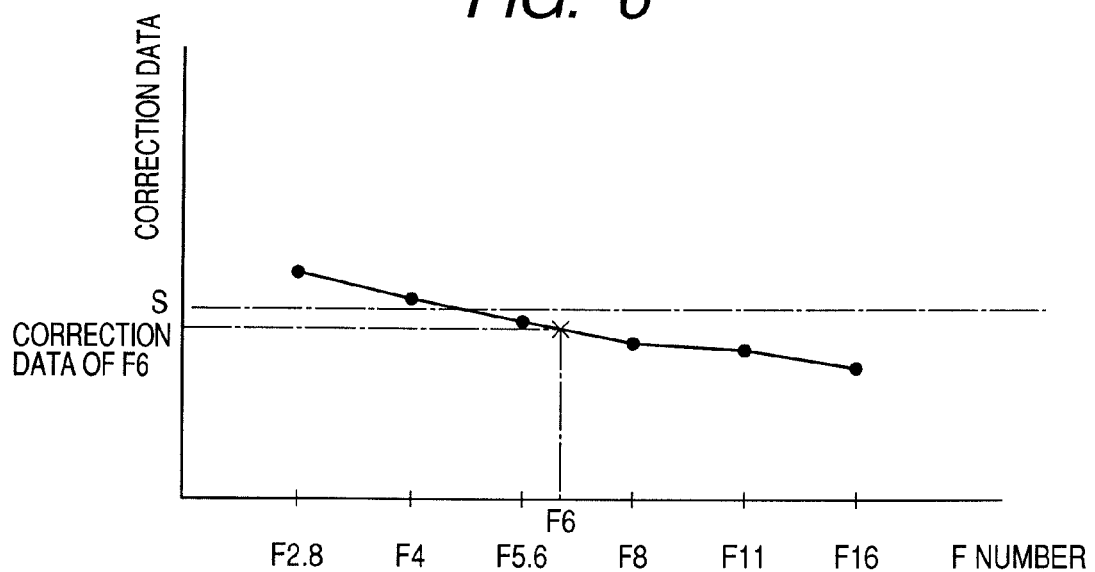
FIG. 5 illustrates a correction data table.
FIG. 6 illustrates calculation of error data.

As per the above, data of relative errors or differences at several aperture values is prepared in advance and stored in the ROM 35 as a set of data in an aperture correction data table as shown in FIG. 5. The data is read and used when the aperture correction is performed.

Error data actually used in the aperture correction is determined from values in the above mentioned aperture correction data table and the value of the aperture control signal by the following method. Here it is assumed that the aperture correction data table contains six correction data values at F2.8 to F16 as shown in FIG. 6. If the current aperture value is F6, interpolation is performed based on the values at F5.6 and F8 in the aperture correction data table by a linear approximation or the like method to calculate the correction data to be used at the current aperture value.

Figure 7:
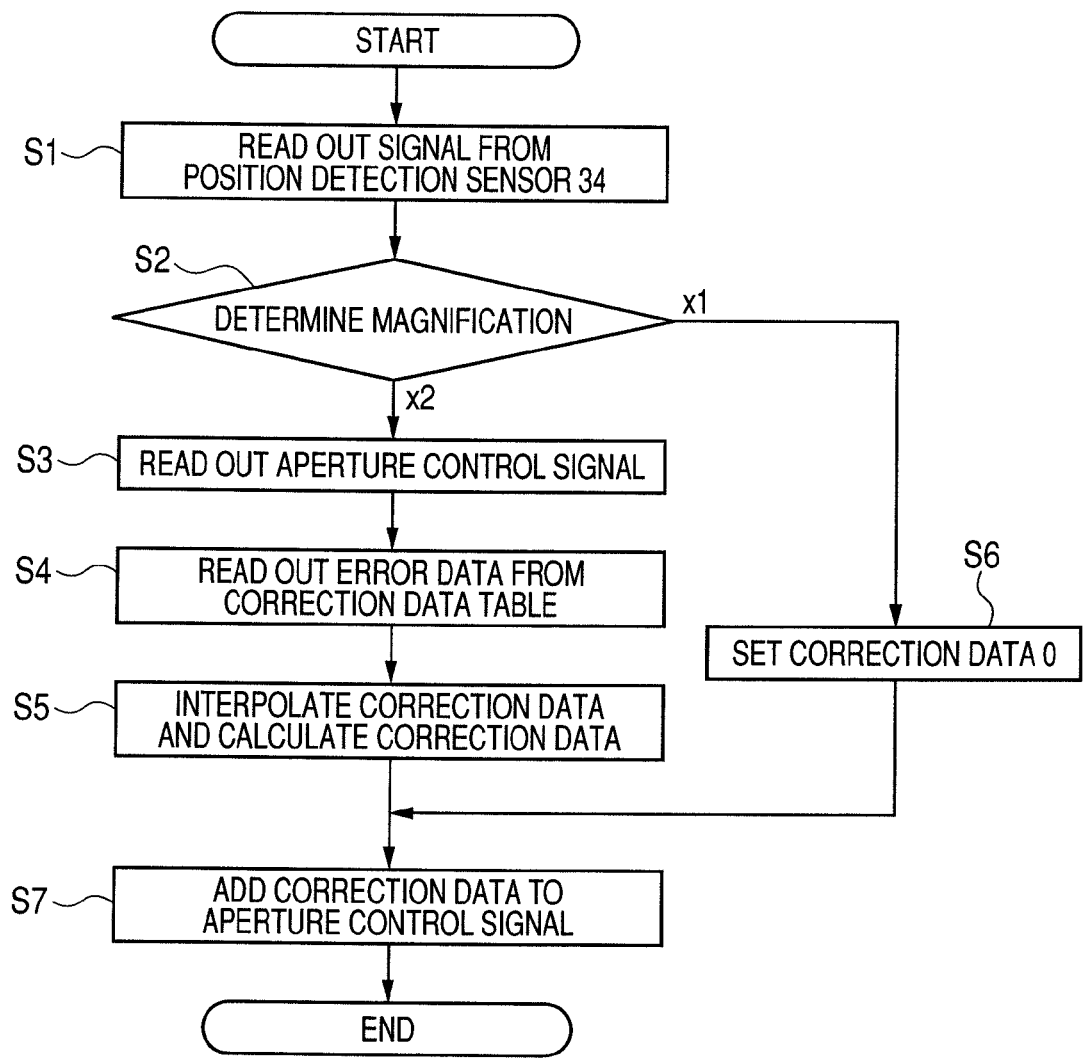
FIG. 7 is a flow chart of a control process.

FIG. 7 is a flow chart of a control process of aperture correction executed by the CPU. First, the CPU 24 reads the position of the extender lens 14 from the position detection sensor 34 (step S1). Then a determination is made from the position signal whether the magnification factor of the extender lens 14 is 1 or 2 (step S2). If the magnification factor of the extender lens 14 is 2, the CPU 24 reads in the aperture control signal of the aperture setting circuit 42 in the television camera 40 through the CPU 43 to calculate aperture correction data (step S3).

Based on the aperture control signal, the error data in the aperture correction data table stored in the ROM 35 in advance that is to be referred to is determined, and that data is read (step S4). An interpolation is performed on the data thus read using method such as a linear approximation or polynomial approximation to calculate correction data for the current aperture value (step S5).

On the other hand, if the magnification factor of the extender lens 14 is 1, the aperture correction data is set to 0 (step S6). The correction data thus determined is added to the aperture control signal from the television camera 40 (step S7), then the signal is output to the drive motor 17 via the drive amplifier 20 to control the stop 13.

As per the above, even if there is an error in the relation between the aperture value and the light quantity, variations of correction depending on the aperture value can be eliminated by preparing aperture correction data taking into account errors $\Delta E1$, $\Delta E2$ in advance. Thus, excellent correction is achieved at all the aperture values.

Although the above description of the embodiment has been directed to a television lens apparatus equipped with an extender lens 14a having a magnification factor of 1 and an extender lens 14b having a magnification factor of 2, the present invention can be implemented in an apparatus equipped with extender lenses having different magnification factors.

The frame aspect ratio of currently used cameras is 16:9 or 4:3 as is well known. There are ratio converter lenses or extender lenses having a magnification factor of 0.8 that render the angle of view of the frame with an aspect ratio of 4:3 equal to the angle of view of the frame with an aspect ratio of 16:9. The present invention can also be applied to apparatuses equipped with such a ratio converter lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-330568, filed Dec. 7, 2006, which is hereby incorporated by reference herein in its entirety.

What is claimed is:

1. A lens apparatus, mountable on a camera apparatus having an image pickup element, the lens apparatus comprising:
    an optical system including a plurality of lenses and a plurality of extender lenses, one of the plurality of extender lenses being selectively locatable in the optical path;
    an aperture unit that adjusts the light quantity in the optical system;
    a controller that controls driving of the aperture unit by an aperture control signal according to brightness information from an image pickup element; and
    a memory that stores at least one set of correction data respectively corresponding to at least one extender lens of the plurality of extender lenses, each set being associated with discrete aperture values for one of the plurality of extender lenses,
    wherein the controller obtains interpolation data for aperture values between the discrete values based on the correction data set stored in the memory associated with the extender lens currently located in the optical path, and drives the aperture unit using an aperture control signal based on the interpolation data and the current aperture value.

2. A lens apparatus according to claim 1, further comprising a detector that detects an extender lens, among the plurality of extender lenses, that is currently located in the optical path, the detector outputting information relating to the extender lens in the optical path to the controller.

3. A lens apparatus according to claim 2, wherein the plurality of extender lenses is mounted on a rotary turret, and the detector detects the extender lens located in the optical path by detecting the rotational position of the rotary turret.

4. A lens apparatus according to claim 1, in which the interpolation data is obtained by linear approximation using at least two of the correction data values corresponding to discrete aperture values.

5. A lens apparatus according to claim 1, wherein the interpolation data is obtained by polynomial approximation using at least two of the correction data values corresponding to discrete aperture values.

6. A lens apparatus according to claim 1, further comprising a rotatable disk-like structure upon which the plurality of extender lenses are arranged,
    wherein the rotatable disk-like structure is configured to rotate so that, one at a time, a selectable one of the plurality extender lenses is positioned on an optical axis.

7. A lens apparatus according to claim 1, wherein the plurality of extender lenses comprises a first extender lens with a magnification factor of 1 and a second extender lens with a magnification factor of 2, the first and second extender lenses being selectively locatable, one at a time, in the optical path.

8. A lens apparatus according to claim 1, wherein the plurality of extender lenses comprises a first extender lens with a magnification factor of 1 and a second extender lens with a magnification factor of 2, and
    wherein the memory stores a set of correction data corresponding to the second extender lens.

9. A camera system comprising:
    a lens apparatus according to any preceding claim; and
    a camera apparatus on which the lens apparatus is mounted, the camera apparatus including an image pickup element that receives light from the lens apparatus.

* * * * *